US009776804B2

(12) United States Patent
Luca et al.

(10) Patent No.: US 9,776,804 B2
(45) Date of Patent: Oct. 3, 2017

(54) VIBRATION DEVICE FOR AN APPARATUS FOR CONVEYING A METAL CHARGE TO A MELTING PLANT

(71) Applicant: DANIELI & C. OFFICINE MECCANICHE SPA, Buttrio (IT)

(72) Inventors: Andrea De Luca, Remanzacco (IT); Marco Ansoldi, Udine (IT)

(73) Assignee: DANIELI & C. OFFICINE MECCANICHE S.P.A., Buttrio (IT)

( * ) Notice: Subject to any disclaimer, the term of this patent is extended or adjusted under 35 U.S.C. 154(b) by 159 days.

(21) Appl. No.: 14/390,767

(22) PCT Filed: Mar. 26, 2013

(86) PCT No.: PCT/IB2013/000506
§ 371 (c)(1),
(2) Date: Oct. 3, 2014

(87) PCT Pub. No.: WO2013/150353
PCT Pub. Date: Oct. 10, 2013

(65) Prior Publication Data
US 2015/0060238 A1    Mar. 5, 2015

(30) Foreign Application Priority Data
Apr. 4, 2012   (IT) .............................. UD2012A0056

(51) Int. Cl.
B65G 27/20     (2006.01)
B65G 27/28     (2006.01)
(Continued)

(52) U.S. Cl.
CPC ............. B65G 27/20 (2013.01); B65G 27/28 (2013.01); B65G 27/30 (2013.01); F27B 3/18 (2013.01);
(Continued)

(58) Field of Classification Search
CPC ........ B65G 27/20; B65G 27/28; B65G 27/30; F27B 3/18; F27D 3/0025; F27D 3/0033;
(Continued)

(56) References Cited

U.S. PATENT DOCUMENTS 5,938,001 A * 8/1999 Turcheck, Jr. .......... B06B 1/166
                                                          198/770
6,024,210 A * 2/2000 Rosenstrom ........... B65G 27/20
                                                          198/758
(Continued)

FOREIGN PATENT DOCUMENTS

IT   WO 2006089897 A1 *  8/2006  ................ F27B 3/18
WO   WO-2006/089865 A1   8/2006
WO   WO-2006/089897 A1   8/2006

OTHER PUBLICATIONS

Search Report for PCT/IB2013/000506, mailed Jun. 17, 2013.
Written Opinion for PCT/IB2013/000506, mailed Jun. 17, 2013.

Primary Examiner — Gerald McClain
Assistant Examiner — Keith R Campbell
(74) Attorney, Agent, or Firm — Marshall, Gerstein & Borun LLP

(57) ABSTRACT

Vibration device for a conveying apparatus (21) to convey a metal charge in a longitudinal direction (X) comprising at least two vibration mechanisms (25, 26) each disposed on opposite sides of the conveying apparatus (21) so as to feed the metal charge. The vibration mechanisms (25, 26) comprise at least a first plurality of eccentric masses (31, 32, 33) having their mass barycenters (B) oriented in parallel directions to each other, and a second plurality of eccentric masses (34, 35) having their mass barycenters (B) disposed angularly offset with respect to the disposition of the barycenters of the first plurality of eccentric masses (31, 32, 33).

9 Claims, 7 Drawing Sheets

(51) Int. Cl.
*B65G 27/30* (2006.01)
*F27D 3/00* (2006.01)
*F27D 13/00* (2006.01)
*F27B 3/18* (2006.01)

(52) U.S. Cl.
CPC ......... *F27D 3/0025* (2013.01); *F27D 3/0033* (2013.01); *F27D 13/002* (2013.01); *F27D 2003/009* (2013.01); *F27D 2003/0038* (2013.01); *F27D 2003/0092* (2013.01); *Y10T 74/18344* (2015.01)

(58) Field of Classification Search
CPC ............. F27D 3/002; F27D 2003/0038; F27D 2003/009; F27D 2003/0092; Y10T 74/18344
USPC ........................................................ 198/770
See application file for complete search history.

(56) References Cited

U.S. PATENT DOCUMENTS

| | | | |
|---|---|---|---|
| 6,276,518 B1 * | 8/2001 | Wierman | B65G 27/32 198/750.1 |
| 6,601,695 B1 * | 8/2003 | Rosenstrom | B06B 1/16 198/750.1 |
| 6,889,820 B2 * | 5/2005 | Rubie | B06B 1/166 198/770 |
| 6,945,382 B2 * | 9/2005 | Harstad | B65G 47/78 198/360 |
| 6,991,092 B2 * | 1/2006 | Chojnacki | B65G 37/00 198/766 |
| 7,387,198 B2 * | 6/2008 | Thomson | B65G 27/20 198/760 |
| 2011/0240442 A1 | 10/2011 | Svejkovsky et al. | |

* cited by examiner

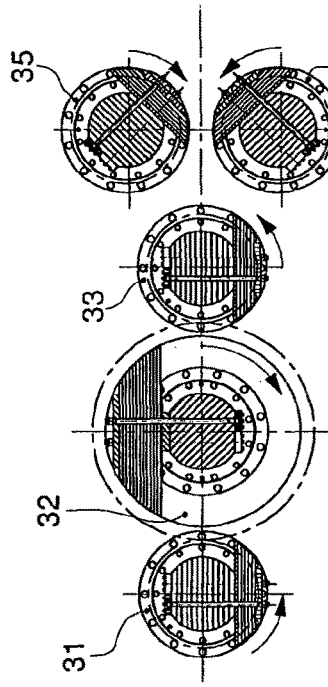
fig. 7c
fig. 7b
fig. 7a
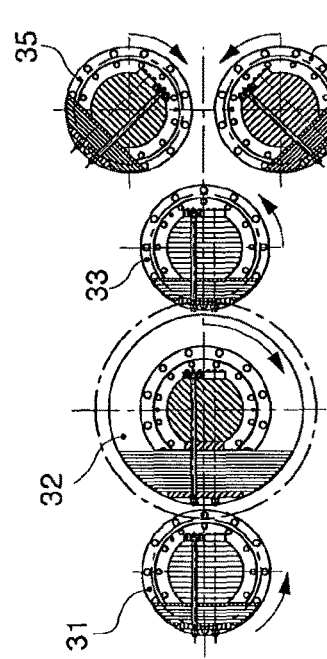
fig. 6c
fig. 6b
fig. 6a

VIBRATION DEVICE FOR AN APPARATUS FOR CONVEYING A METAL CHARGE TO A MELTING PLANT

FIELD OF THE INVENTION

The present invention concerns a vibration device applied in an apparatus to convey a metal charge consisting for example of iron scrap, sponge iron (DRI), cast iron slabs or other, to a melting furnace in a steelworks.

The vibration device is provided with eccentric masses that are associated on two opposite sides of the channel that conveys the metal charge, which are suitable to make the conveyor channel and the respective bearing structure vibrate at a determinate frequency, to allow the metal charge contained therein to advance.

BACKGROUND OF THE INVENTION

Vibration devices are known, with rotating eccentric masses, which are applied on conveying apparatuses of the vibrating or oscillating type, to convey a metal charge to a melting furnace of a steelworks.

It is known that these conveying apparatuses have extremely large overall lengths, in the range of some tens of meters, both to allow a suitable loading plane, so as to guarantee the desired load, and also to define a segment long enough to be able to pre-heat the metal charge while it is being conveyed. Each apparatus must therefore be sized to support a metal charge with a weight of some tens of tonnes.

To support these high loads, known apparatuses each comprise a very heavy bearing structure, even more than a hundred tonnes, on which a vibration device is mounted. Such bearing structures, on the upper part of which a conveyor channel is mounted, are supported by support elements that allow them to oscillate, or vibrate, mainly along their longitudinal axis, while remaining substantially horizontal. The oscillation is conferred by the vibration device associated therewith and allows to feed the metal charge forward inside the conveyor channel.

Known vibration devices, associated with the conveying apparatuses, normally consist of one or more pairs of eccentric masses, rotating in synchrony with each other, to generate a vibrational motion that is transmitted to the bearing structure and the corresponding conveyor channel.

The bearing structure, the conveyor channel and the vibration device thus form a structural combination that has its own frequency of resonance. The longitudinal accelerations imparted to the structural combination by the vibration device cause a corresponding movement of the metal charge with respect to the conveyor channel which feeds it forward to the melting furnace.

The forces generated by the rotating masses of the vibration device must therefore not only be very high, that is, such as to induce an adequate horizontal and alternate force to the structural combination, but also such as to impart on the latter adequate accelerations, in the range of at least 10 m/s², and also a frequency of oscillation that is considerably different from the forces of resonance of the structural combination, with or without the metal charge loaded inside.

In particular, document WO2006/089865 in the name of the present Applicant discloses a vibration device that is mounted at one end of the conveyor channel and provides to impart on the latter a vibration effect such as to feed forward the mass of metal charge substantially continuously.

This known vibration device comprises two identical vibration mechanisms, disposed laterally and on opposite sides of the support structure of the conveyor channel.

Each vibration mechanism is provided with a pair of eccentric masses that rotate synchronized with each other and in opposite directions of rotation.

Each of the eccentric masses is mounted on rotation shafts having parallel axes of rotation, orthogonal to the direction of feed of the metal charge and disposed substantially vertical, that is, orthogonal with respect to the feed plane of the conveyor channel.

It is also known that, for steelworks which require particular characteristics of the conveyor channel, which imply an overall increase in the latter, due for example to the insulation system or cooling system, the above vibration devices must be able to move high loads. This need requires an increase in the weight of the rotating eccentric masses in order to increase the vibrational effect and consequently the production capacity of the vibration devices.

Each vibration mechanism is provided with a first eccentric mass that is heavier and bigger than a second eccentric mass that is made to rotate synchronized with the first eccentric mass. The first eccentric mass has its mass barycenter disposed angularly offset with respect to the second eccentric mass in order to determine the feed of the metal charge.

It is also known that, in order to guarantee an adequate vibrational effect, the first eccentric masses must be even heavier than two tonnes, and therefore the centrifugal forces that are generated are particularly high, and constitute a factor of fundamental importance for sizing the support elements, such as for example bearings.

It is therefore clear that the mechanical resistance to the stresses of the centrifugal forces due to the support elements is a constraining factor with regard to the sizing of the masses and hence to the efficiency and production capacity of the vibration device.

One purpose of the present invention is to obtain a vibration device that is able to develop a resulting high acting force, and which therefore allows to transfer large loads of metal charge through the conveyor channel.

Another purpose of the present invention is to limit the stresses to which the support elements of the eccentric masses of the vibration device are subjected.

Another purpose is to obtain a vibration device in which the maintenance interventions on its components are reduced.

Another purpose of the present invention is to obtain a vibration device that has limited bulk, at least in the transverse direction with respect to the direction of feed of the metal charge.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purposes, a vibration device is applied to a conveying apparatus to determine vibrations or oscillations, and to feed forward a metal charge along a determinate direction of feed.

The vibration device comprises at least two vibration mechanisms, each of which is disposed on opposite sides of the conveying apparatus and is suitable to generate a vibration to feed the metal charge.

Each of the vibration mechanisms comprises a plurality of eccentric masses having their axes of rotation substantially orthogonal to respective straight lines parallel to above-mentioned longitudinal direction. In other words, the pairs of opposite eccentric masses of each vibration mechanism have their respective axes of rotation lying on a plane that is always transverse, advantageously orthogonal, to the plane of feed of the metal charge.

This particular disposition of the axes of rotation allows to generate centrifugal forces due to the rotation of the eccentric masses that feed the metal charge along the conveying apparatus.

According to a feature of the present invention, each of the vibration mechanisms comprises at least a first plurality of the above-mentioned eccentric masses which have their mass barycenters oriented in directions that are substantially parallel to each other.

In particular, the orientation and positioning of the barycenters of the eccentric masses is determined considering the straight line joining the center of rotation of each eccentric mass with the position of the mass barycenter.

Each of the vibration mechanisms also comprises a second plurality of the above-mentioned eccentric masses which have their mass barycenters disposed angularly offset with respect to the respective directions of positioning of the barycenter of the first plurality of eccentric masses.

The eccentric masses of each vibration mechanism are configured and kinematically actuated to determine, during use, a resultant centrifugal force substantially parallel to the longitudinal direction. The actuation and particular configuration of the eccentric masses is determined in reciprocal relation between the eccentric masses of each of the pluralities of masses, and also between each one of the first and second plurality of eccentric masses, and between the vibration mechanisms.

With the present invention, it is therefore possible to increase the overall mass in movement, distributing the same over a plurality of eccentric masses and not only on two eccentric masses as described in the state of the art.

This solution therefore allows to stress the support elements of the eccentric masses much less, giving advantages in terms of their longer life and their sizes.

Furthermore, given that the overall resulting force deriving from the sum of the centrifugal forces has only one component in the longitudinal direction, as a consequence the conveying apparatus is not subjected to transverse forces which stress the latter in an unwanted manner.

The conveying apparatus is subjected to a variable oscillation along the above-mentioned longitudinal direction. During these oscillations, both positive and negative, variations in acceleration are provided, determined by the eccentric masses which determine the feed of the metal charge.

The variations in acceleration during oscillations are determined not only by the eccentric masses and their weight, but also by the angular offset and the suitable kinematic movement of the eccentric masses of the first plurality with respect to those of the second plurality.

According to another feature of the invention, the eccentric masses of the first plurality are mounted on respective shafts that are kinematically coupled with each other so as to rotate synchronized. Thanks also to the particular disposition of the mass barycenters of the first plurality of eccentric masses, this allows to optimize the thrust effect to which the metal charge is subjected during its feed.

According to another feature of the present invention, the eccentric masses of the first plurality have their respective axes of rotation lying on the same first plane, which is parallel to the longitudinal direction.

According to one form of embodiment of the present invention, the first plurality of eccentric masses comprises a first, second and third eccentric mass. The second eccentric mass has a weight double that of the first and third eccentric masses, and is suitable to rotate with a speed that is half the speed of rotation of the first and third eccentric masses. This particular configuration and disposition of the eccentric masses is such that, during the rotation of the latter, the centrifugal forces deriving therefrom entail a cancellation of the transverse force components. In fact the transverse forces do not entail any feed effect of the charge but only harmful effects with regard to the stresses to which the support structure of the conveying apparatus is subjected.

According to another feature of the present invention, the eccentric masses of the second plurality are mounted on respective shafts, kinematically coupled to each other so as to rotate synchronized.

According to another feature of the present invention, kinematic means are provided to kinematically couple the shafts of the first and second plurality of eccentric masses, and to make the second plurality of eccentric masses rotate with a greater speed than that of the first plurality of eccentric masses. This particular movement of the first and second plurality of eccentric masses allows to obtain overlapping of the components of resultant force that are favorable for the feed of the metal charge.

According to another feature of the present invention, the eccentric masses of the second plurality have their respective axes of rotation lying on the same second plane, which is transverse with respect to the longitudinal direction.

According to another form of embodiment, the second plurality of eccentric masses comprises a fourth and a fifth eccentric mass having the same weight, and having their respective mass barycenters offset angularly by the same angle and positioned specular with respect to the longitudinal direction.

This particular disposition allows to obtain, during their rotation, an instantaneous cancellation of the transverse components of the centrifugal forces, therefore eliminating unwanted effects of transverse forces.

In some forms of embodiment of the invention, said angle is comprised between 40° and 50°, preferably about 45°.

In other forms of embodiment of the present invention, synchronization means are associated with the vibration mechanisms to synchronize the rotation of the respective eccentric masses and to prevent the occurrence of stresses transverse to the longitudinal direction.

DESCRIPTION OF THE DRAWINGS

These and other characteristics of the present invention will become apparent from the following description of one form of embodiment, given as a non-restrictive example with reference to the attached drawings wherein:

FIGS. 6a, 7a, 8a, 9a are schematic plan representations of the details in FIG. 5 in some operating configurations;

FIGS. 6b, 7b, 8b, 9b are schematic representations of forces acting on the details in FIG. 5 during use;

FIGS. 6c, 7c, 8c, 9c are vectorial representations of the forces shown in FIGS. 6b, 7b, 8b, 9b.

Figure 1:
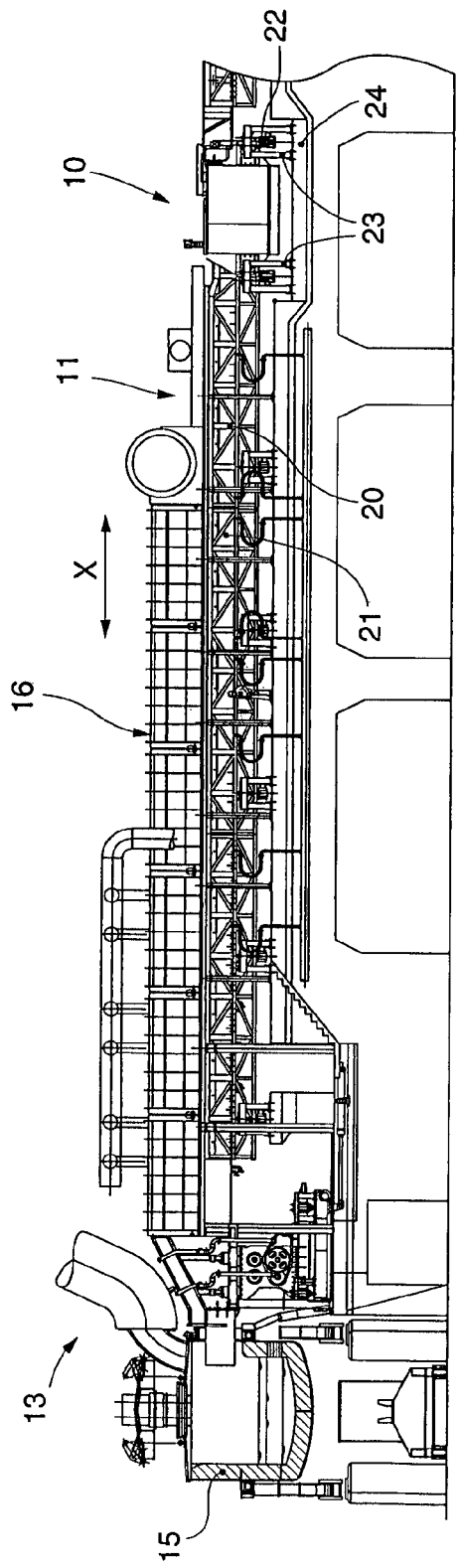
FIG. 1 is a schematic representation of a melting plant comprising a conveying apparatus to which a vibration device according to the present invention is associated.

To facilitate comprehension, the same reference numbers have been used, where possible, to identify identical common elements in the drawings. It is understood that elements and characteristics of one form of embodiment can conveniently be incorporated into other forms of embodiment without further clarifications.

DETAILED DESCRIPTION OF ONE FORM OF EMBODIMENT

With reference to FIG. 1, a vibration device 10 according to the present invention is applied to a conveying apparatus 11 of a melting plant 13 of a known type.

The conveying apparatus 11 can reach some tens of meters and is able to convey a metal charge, for example of metal scrap, to a melting furnace 15 with a load in the range of about 7 tonnes per minute.

The apparatus 11 is inserted, for a good part of its length, in a pre-heating tunnel 16, in which the metal charge is pre-heated, for example using the same fumes produced by the melting furnace 15.

The apparatus 11 comprises a bearing structure 20, oblong and substantially horizontal, on the upper part of which a conveyor channel 21 is attached, having a substantially U-shaped cross section.

Figure 2:
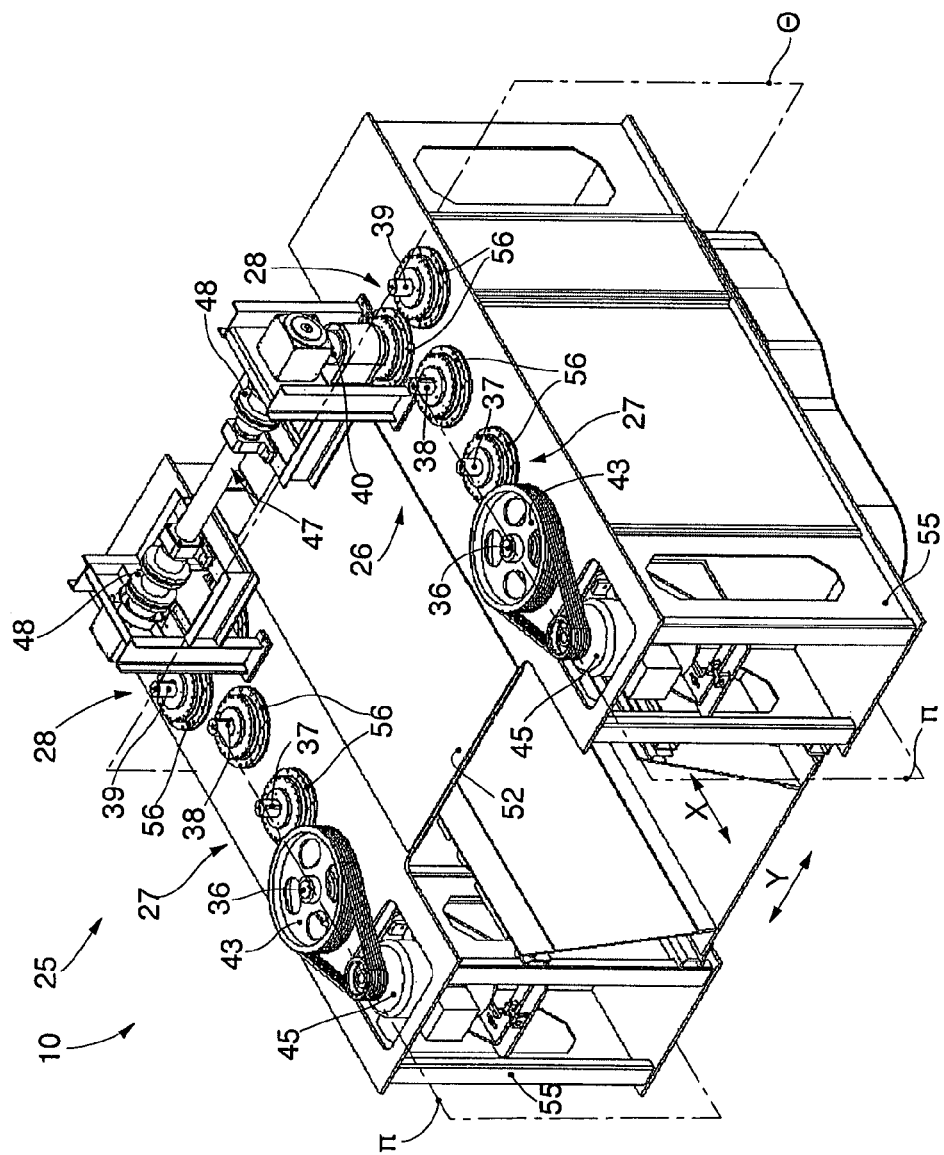
FIG. 2 is a perspective view of a vibration device according to the present invention from a first angle.

The bearing structure 20 is supported by a plurality of tie rods 22 (FIG. 2) supported by vertical pillars 23 attached to a base 24 (FIG. 1) of the plant 13, and can oscillate both in a longitudinal direction X and also in a transverse direction Y (FIG. 2) with respect to the longitudinal direction X, remaining substantially horizontal.

The vibration device 10 (FIG. 1) is mounted at one of the two ends of the corresponding bearing structure 20 and is able to impart on the latter, and on the conveyor channel 21, a vibrational or oscillating motion, at determinate frequencies and accelerations, such as to feed the mass of the metal charge longitudinally and substantially continuously at a speed of about 100 mm/s, so as to convey a determinate quantity of metal charge into the melting furnace 15.

Figure 3:
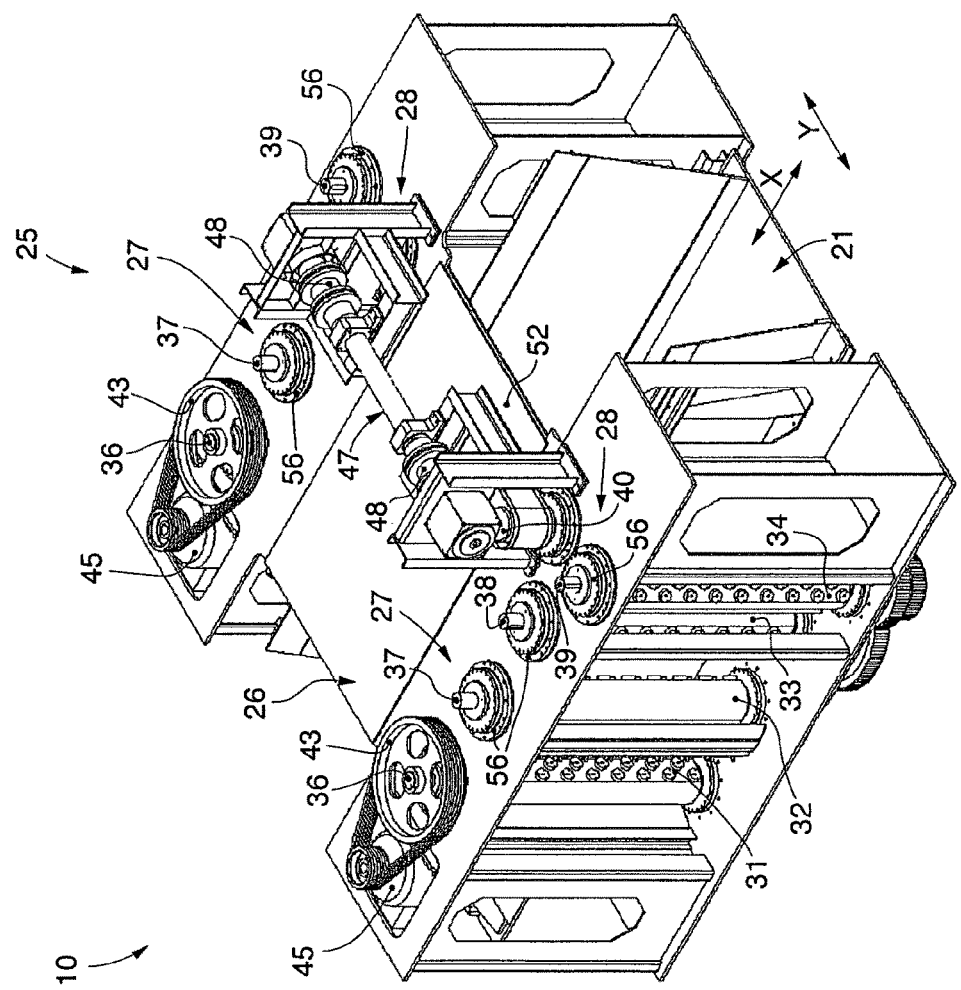
FIG. 3 is a perspective view of the device in FIG. 2 from a second angle.
Figure 4:
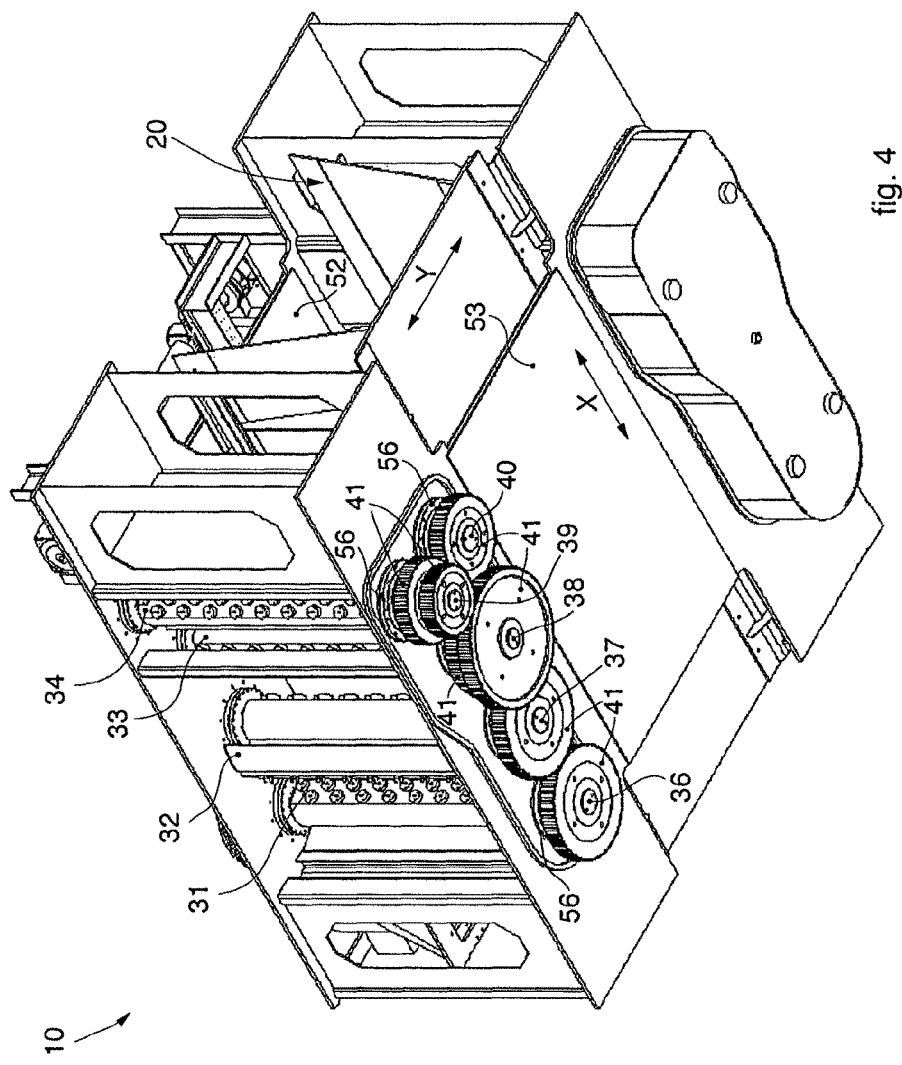
FIG. 4 is a perspective view from below of the device in FIG. 2.

The vibration device 10 (FIGS. 2 and 3) comprises a first vibration mechanism 25 and a second vibration mechanism 26, substantially identical and disposed on opposite sides of the bearing structure 20 and the conveyor channel 21.

Both the first 25 and the second mechanism 26 (FIGS. 2-5) comprise in turn a first group 27 and a second group 28 of eccentric masses, that is, respectively a first 31, a second 32, a third eccentric mass 33, belonging to the first group 27, and a fourth 34 and a fifth eccentric mass 35 belonging to the second group 28.

The first group 27 of each mechanism 25, 26 lies substantially on a first vertical plane Π, parallel to the longitudinal direction X, while the second group 28 of each mechanism 25, 26 lies on a second vertical plane Θ, parallel to the transverse direction Y.

The first 31, second 32, third 33, fourth 34 and fifth 35 eccentric masses 35 are mounted respectively on a first 36, second 37, third 38, fourth 39 and fifth rotation shaft 40.

The first 36, second 37 and third shaft 38 have their respective axes of rotation lying on the first plane Π, that is, the corresponding first 31, second 32, and third 33 eccentric masses are disposed aligned with respect to each other and parallel to the longitudinal direction X.

The fourth 39 and the fifth shaft 40 have their respective axes of rotation lying on the second plane Θ, that is, the corresponding fourth 34 and fifth eccentric masses 35 are disposed parallel to the transverse direction Y.

Figure 5:
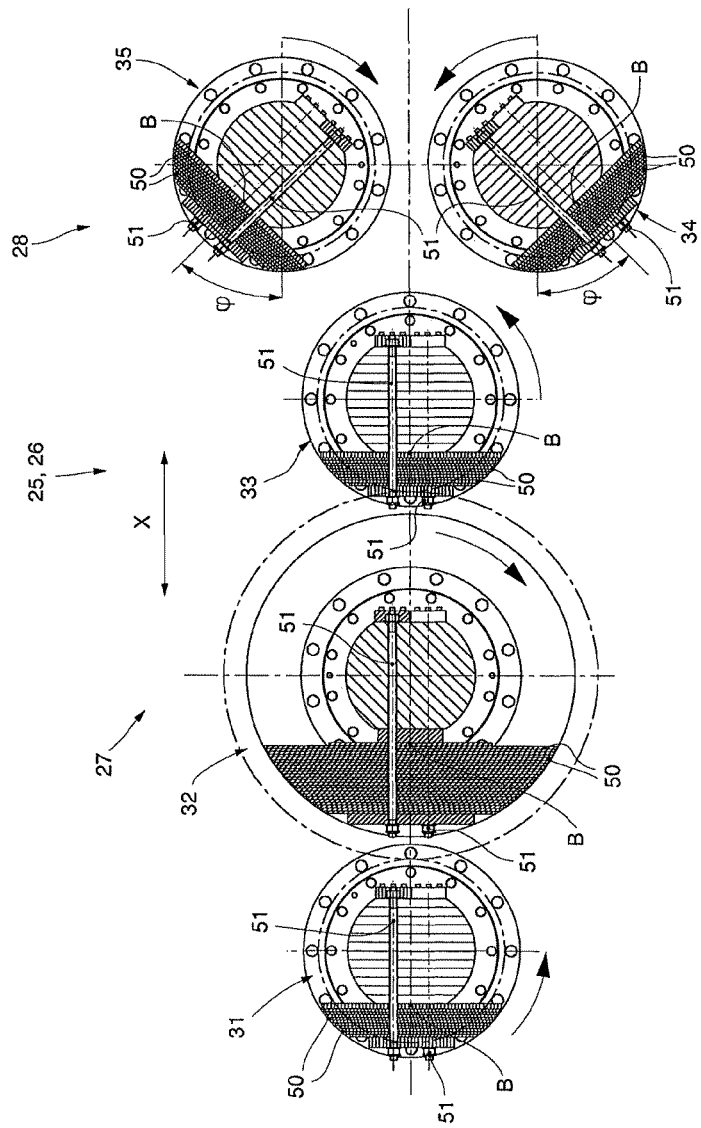
FIG. 5 is a schematic plan representation of details of the device in FIG. 2.
Figure 9A:
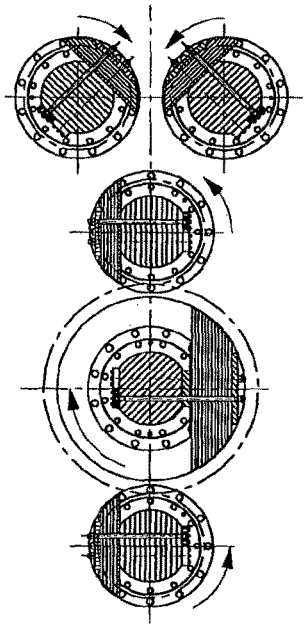
Figure 9B:
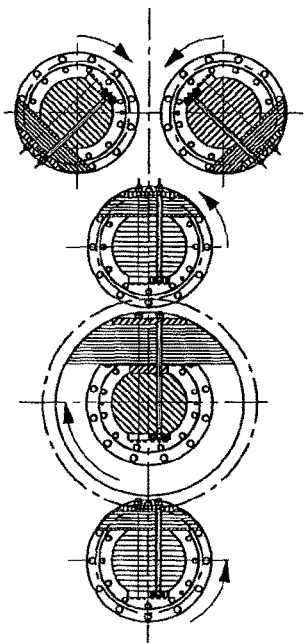
Figure 9C:
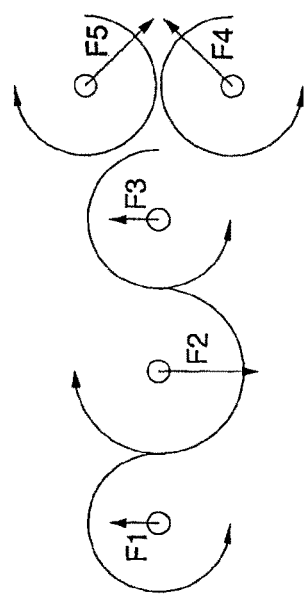

As shown in FIG. 5, in a first working condition of the mechanisms 25, 26, the first eccentric mass 31, the second eccentric mass 32 and the third eccentric mass 33 have their mass barycenters B aligned reciprocally with respect to each other along an axis parallel to the longitudinal direction X. The mass barycenters B are all disposed angled by the same angle, in this case facing toward the left external edge of each of them. During the rotation of the respective shafts 36, 37, 38 the mass barycenters B are disposed always oriented in the same direction, possibly in opposite positions. More specifically, the position of the mass barycenter B of the second eccentric mass 32 is in an opposite position with respect to the position of the mass barycenter B of the first 31 and third eccentric mass 33.

The fourth 34 and fifth eccentric masses 35 on the contrary have their mass barycenters B offset angularly by an angle φ, greater than zero, in this case +45° and, respectively, −45° with respect to the longitudinal direction X. In other words, the barycenters B of the fourth 34 and fifth eccentric masses 35 are disposed in specular positions with respect to each other and angularly offset with respect to the first 31, second 32 and third eccentric masses 33.

The first 31 and third eccentric mass 33 are the same weight, which can be indicatively comprised between 1500 kg and 3000 kg. The second eccentric mass 32 has a weight that is substantially double the weight of the first 31 and third eccentric masses 33.

The fourth 34 and fifth eccentric mass 35 are substantially the same weight, in this case equal to the weight of the first 31 and third eccentric masses 33.

At the end of the shafts 36-40 of each eccentric mass 31-35 toothed wheels 41 are mounted (FIG. 4), which reciprocally engage with each other so as to correlate the speeds of rotation of each of the shafts 36-40.

The train of gears is such that the speed of rotation of the first shaft 36 is equal to half the speed of rotation of the second shaft 37, and is equal to the speed of rotation of the third shaft 38.

The fourth 39 and the fifth shaft 40 have a speed that is double that of the first 36 and third shaft 38.

Furthermore, as is obvious for a person of skill, given the particular conformation of the train of toothed wheels 41, the direction of rotation of the second shaft 37 is opposite that of the first 36 and third shaft 38. The direction of rotation of the fourth shaft 39 is concordant with that of the first 36 and third shaft 38, while it is opposite that of the fifth shaft 40.

At one end of the first shaft 36 of the first eccentric mass 31, a pulley 43 is keyed which in turn is made to rotate by a motor 45 by means of belt-type transmissions.

When the motor 45 is driven it makes the first shaft 36 rotate and consequently the other shafts 37-40 as well, with their respective speeds of rotation determined by the transmission ratios between the individual toothed wheels, and determined so as to satisfy the conditions described above.

Merely by way of example, the motor 45 is made to rotate at a speed of about 750 rpm and between the motor 45 and the pulley 43 there is a transmission ratio of 1:3, that is, such as to determine a rotation of the first shaft 36 with a speed of about 250 rpm.

The fifth shafts 40 (FIGS. 2-3) of the first 25 and second mechanism 26 are connected to each other by means of a connection bar 47 and two pairs of conical gears, not visible in the drawings. In this way the eccentric masses 31-35 of the first mechanism 25 are connected to each other and hence always in phase with the eccentric masses 31-35 of the second mechanism 26.

In particular, the connection bar 47 comprises two coaxial semi-axles, connected by elastic joints 48, of a known type.

Each eccentric mass 31-35 is provided with a plurality of sheets 50 (FIG. 5) held compressed on each shaft 36-40 by means of bolts 51.

The shafts 36-40 of each group 27, 28 are mounted on a respective support frame 55 that is solidly attached to the bearing structure 20 and the conveyor channel 21.

Support elements 56, for example bearings, are mounted at the respective ends of each of the shafts 36-40 to allow them to rotate and to support the stresses due to the centrifugal forces.

The first mechanism 25 and second mechanism 26 (FIGS. 2-4) are mechanically connected with a first plate 52 that is disposed above and between the conveyor channel 21, and with a second plate 53 disposed below. The first 52 and second plate 53 allow to transfer stresses between the first 25 and second mechanism 26 to compensate possible transverse stresses that are generated during the functioning of the vibration device 10.

We shall now describe the functioning of the vibration device 10 according to the present invention. In particular, we shall refer to the functioning of the first vibration mechanism 25, it being obvious that to determine a uniform feed of the metal charge through the section of the conveyor channel 21 it is necessary to activate both mechanisms 25 and 26.

When the motor 45 is driven, the eccentric masses 31-35 are made to rotate with their respective speeds of rotation determined by the transmission ratios between the toothed wheels 41.

During the rotation the eccentric masses 31-35 are each subjected to a respective centrifugal force F1, F2, F3, F4, F5 (FIGS. 6b, 7b, 8b, 9b) directed radially toward the outside of the eccentric mass.

With reference to FIGS. 6a, 6b, 6c, the eccentric masses 31-35 are disposed according to the configuration described previously with reference to FIG. 5. During the rotation of the eccentric masses 31-35, and when they are disposed instantaneously in this configuration, the sum of the centrifugal forces F1, F2, F3, F4, F5 due to the corresponding eccentric masses determines a resultant force FRmax having its maximum intensity that can be reached during a cycle of rotation of the first shaft 36. The resultant force FRmax has an opposite direction to the direction of feed of the metal charge. The FRmax therefore determines a sudden oscillation of the bearing structure 20 and hence of the conveyor channel 21 in the opposite direction to the direction of feed of the metal charge.

The metal charge in turn, and due to the inertia effect, advances toward the melting furnace 15.

As shown in FIG. 6c, the transverse components of the centrifugal forces F4 and F5, that is, parallel to the transverse direction Y, reciprocally cancel each other out.

Following a rotation of the first shaft 36 by an angle of 90° in an anti-clockwise direction with respect to the configuration in FIG. 6a, there is a consequent rotation of the eccentric masses 31-35 similar to what is shown in FIG. 7a.

In this condition, the centrifugal forces F1, F2, F3, due respectively to the first 31, second 32 and third eccentric masses 33 reciprocally cancel each other out, given that the sum of the centrifugal forces F1 and F2 is equal to the centrifugal force F3.

The fourth 34 and fifth eccentric masses 35 in turn generate a resultant force FR concordant in direction with the direction of feed of the metal charge and having a lesser intensity than the resultant force FRmax. The transverse components, that is, those parallel to the transverse direction Y, of the centrifugal forces F4 and F5 reciprocally cancel each other out.

During this rotation of the first shaft 36, there is also an inversion of direction of the resultant force FR.

Figure 8A:
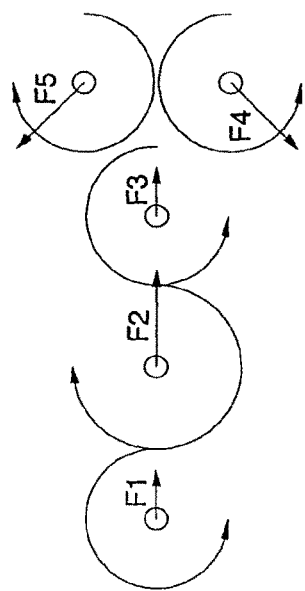
Figure 8B:
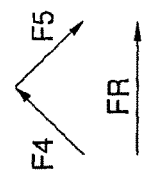
Figure 8C:
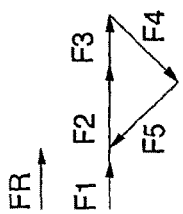

With reference to FIGS. 8a, 8b, 8c, a further rotation is shown of the first shaft 36 by 90° with respect to the configuration assumed in FIG. 7a.

In this configuration, the centrifugal forces F1, F2, F3 are reciprocally summed in a direction concordant with the direction of feed of the material, while the centrifugal forces F4 and F5 determine a partial cancellation of said components. In this case too, the resultant force FR deriving therefrom is parallel to the longitudinal direction X and has a direction concordant with the direction of feed of the metal charge, while the transverse components reciprocally cancel each other out.

Following another rotation of the first shaft 36 by an angle of 90° in an anti-clockwise direction with respect to the configuration shown in FIG. 8a, the components of the centrifugal forces F1, F2 and F3 are canceled, and the sum of the centrifugal forces F4 and F5 determine a resultant force FR with a longitudinal component only, given that the transverse components reciprocally cancel each other out.

From the above description it is clear that the transverse components of each of the centrifugal forces F1, F2, F3, F4 and F5 are at all times reciprocally compensated and equal to zero, determining a resultant force FR that is substantially always parallel to the longitudinal direction X.

It is therefore obvious that the step of actual feed of the metal charge inside the conveyor channel 21 is determined in the interval of time near to, and in an angular sector near to, those in which the resultant maximum force FRmax is reached.

The resultant forces FR having a direction concordant with the direction of feed of the metal charge, although they are unfavorable with regard to the feed, are less intense than the resultant maximum force FRmax and are distributed in a wider time interval and a wider angular sector. These factors are such that the inertia effects acting on the metal charge, although they determine a minimum retreat of the metal charge in the conveyor channel 21, do not return it to its initial position but to a position that is in any case further forward than the start-of-cycle position.

It is clear that modifications and/or additions of parts may be made to the vibration device as described heretofore, without departing from the field and scope of the present invention.

It is also clear that, although the present invention has been described with reference to some specific examples, a person of skill in the art shall certainly be able to achieve many other equivalent forms of vibration device, having the characteristics as set forth in the claims and hence all coming within the field of protection defined thereby.

The invention claimed is:

1. Vibration device for a conveying apparatus to convey a metal charge in a longitudinal direction comprising at least two vibration mechanisms each disposed on opposite sides of said conveying apparatus so as to feed said metal charge, each of said vibration mechanisms comprising a plurality of eccentric masses having their axes of rotation substantially orthogonal to straight lines parallel to the longitudinal direction, wherein each of said vibration mechanisms comprises at least a first plurality of said eccentric masses, the first plurality comprising a first, a second, and a third eccentric mass, the first and third eccentric masses arranged to rotate at a first speed, the second eccentric mass having a double weight with respect to that of the first and the third eccentric masses, the second eccentric mass arranged to rotate at a second speed which is half the first speed, the first, second and third eccentric masses arranged to have their respective mass barycenters aligned along an axis which is parallel to the longitudinal direction when in a first working condition, and a second plurality of said eccentric masses arranged, when in the first working condition, to have their mass barycenters rotated at an angle about their respective rotational shafts to space the respective mass barycenters away from the axis, said eccentric masses of each vibration mechanism being configured and kinematically actuated in reciprocal relation both between the eccentric masses of each plurality, and between said first and second plurality, and also between said vibration mechanisms, in order to determine, during use, a resulting centrifugal force substantially parallel to said longitudinal direction and a transverse component with respect to said longitudinal direction, substantially zero.

2. Vibration device as in claim 1, wherein said eccentric masses of said first plurality are mounted on respective shafts kinematically coupled so as to rotate reciprocally synchronized with respect to each other.

3. Vibration device as in claim 1, wherein said eccentric masses of said first plurality have respective axes of rotation lying on the same first plane which is parallel to said longitudinal direction.

4. Vibration device as in claim 1, wherein said eccentric masses of said second plurality are mounted on respective shafts, kinematically coupled so as to rotate reciprocally synchronized with respect to each other.

5. Vibration device as in claim 2, wherein a gear train including toothed wheels is provided to kinematically couple the shafts of the first and second plurality of eccentric masses with respect to each other and to make said second plurality of eccentric masses rotate at a greater speed than that of the first plurality of eccentric masses.

6. Vibration device for a conveying apparatus to convey a metal charge in a longitudinal direction comprising at least two vibration mechanisms each disposed on opposite sides of said conveying apparatus so as to feed said metal charge, each of said vibration mechanisms comprising a plurality of eccentric masses having their axes of rotation substantially orthogonal to straight lines parallel to the longitudinal direction, wherein each of said vibration mechanisms comprises at least a first plurality of said eccentric masses arranged to have their respective mass barycenters aligned along an axis which is parallel to the longitudinal direction when in a first working condition, and a second plurality of said eccentric masses arranged, when in the first working condition, to have their mass barycenters rotated at an angle about their respective rotational shafts to space the respective mass barycenters away from the axis, said eccentric masses of each vibration mechanism being configured and kinematically actuated in reciprocal relation both between the eccentric masses of each plurality, and between said first and second plurality, and also between said vibration mechanisms, in order to determine, during use, a resulting centrifugal force substantially parallel to said longitudinal direction and a substantially zero transverse component with respect to said longitudinal direction; and wherein said eccentric masses of said second plurality have their respective axes of rotation lying on a second plane ($\Theta$), which is transverse to said longitudinal direction.

7. Vibration device as in claim 6, wherein said second plurality of eccentric masses comprises a fourth and a fifth eccentric mass of the same weight, angularly offset by the same angle ($\phi$) and disposed specular to said longitudinal direction.

8. Device Vibration device as in claim 7, wherein said angle ($\phi$) is between 40° and 50°.

9. Vibration device as in claim 1, wherein connection plates are disposed above and below said conveying apparatus and connect the vibration mechanisms to each other.

* * * * *